May 21, 1963     E. H. SAHAGIAN     3,090,415
RESILIENT WHEELS
Filed Feb. 13, 1962     2 Sheets-Sheet 1
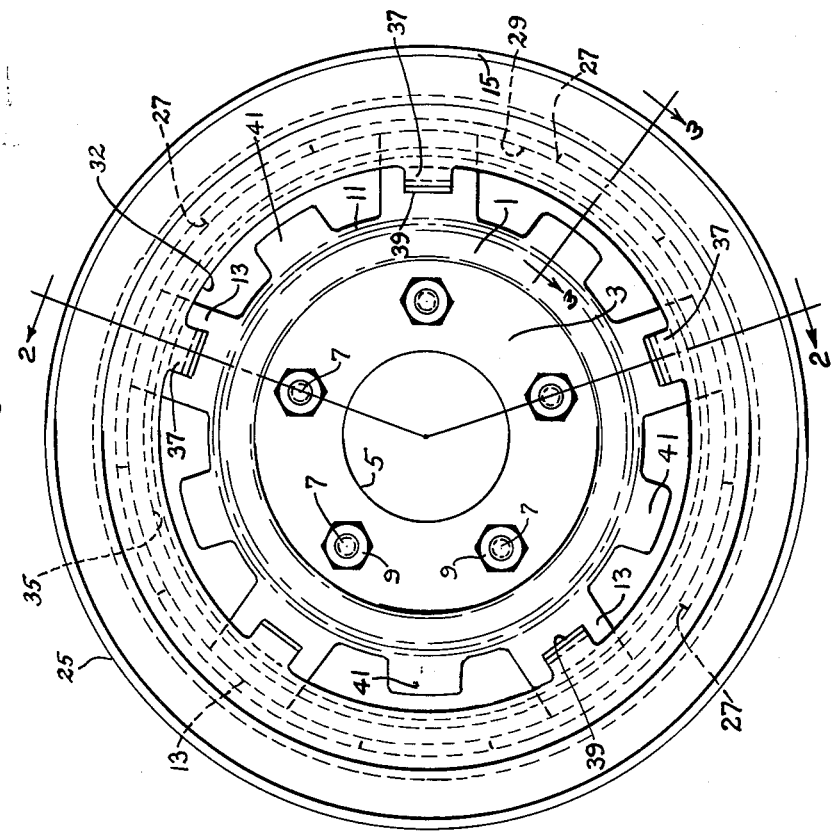
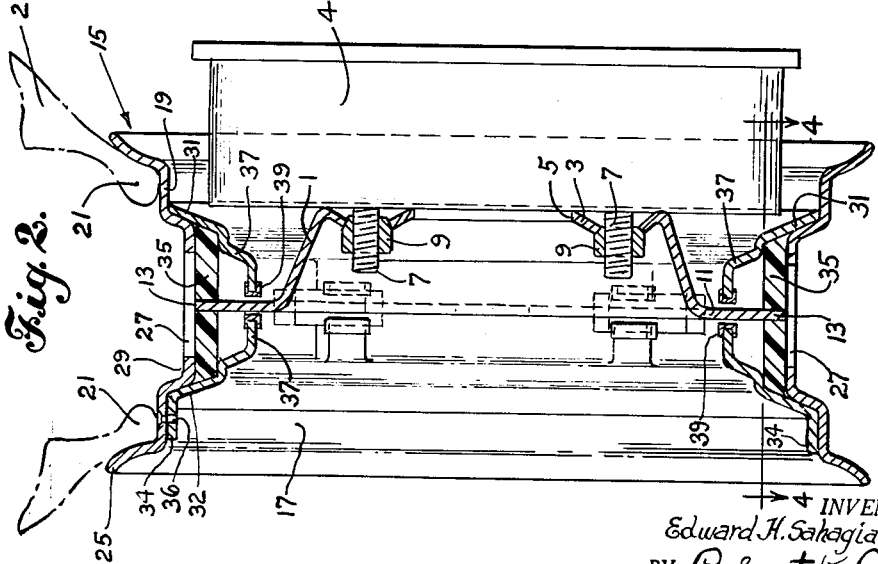
INVENTOR.
Edward H. Sahagian
BY Robert K. Randall
atty.

May 21, 1963 E. H. SAHAGIAN 3,090,415
RESILIENT WHEELS
Filed Feb. 13, 1962 2 Sheets-Sheet 2
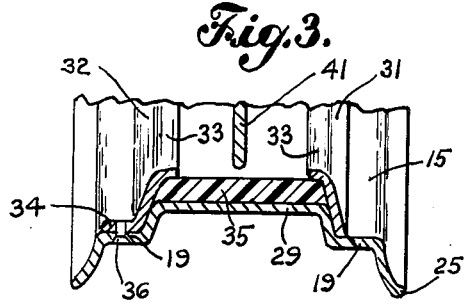
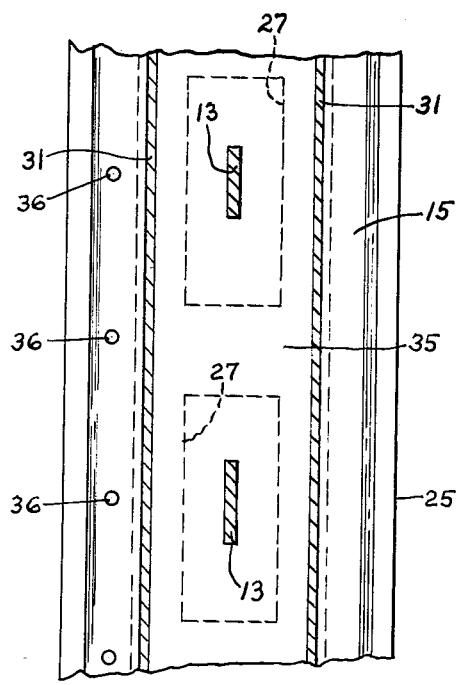
INVENTOR.
Edward H. Sahagian.
BY Robert K. Randall,
atty.

United States Patent Office 3,090,415
Patented May 21, 1963

3,090,415
RESILIENT WHEELS
Edward H. Sahagian, 46 Brent St., Dorchester, Mass.
Filed Feb. 13, 1962, Ser. No. 172,906
6 Claims. (Cl. 152—41)

This invention relates to vehicle wheels in general and more particularly to the spring wheel type, so-called, in which resilient means or elements are provided between the rim and the hub. The common purpose of such provisions is the well-known and long sought aim of reducing the unsprung weight of the vehicle to a minimum, so that the least possible part of the road shocks delivered to the tire and rim shall reach the hub and axle and thus be transmitted through the spring suspension of the vehicle to the body and the passengers therein.

In spite of the enormous advance attained by the conventional pneumatic tire in absorbing and suppressing road shocks, a very substantial amount of shock and vibration still is passed on by the tire to the standard metallic rim rigidly affixed to or integral with the wheel and the metallic hub fixed therein, and thence through the springs to the body. Lower tire pressures and softer springing have reduced the amount of shock and vibration thus transmitted, but these resorts bring other well known drawbacks in their train. As is obvious, the lesser the unsprung weight the lesser the inertia and hence the momentum of these parts in delivering their blows which transmit the shocks and vibration to the running gear and ultimately to the body and passengers of the vehicle.

It is accordingly the object of the present invention to reduce the unsprung weight to the practical minimum.

To these ends the invention separates the rim from all metallic contact with the wheel and hub of the vehicle by suspending the wheel within the rim in a preferably continuous band of elastomeric material such as butyl rubber or neoprene bonded to the rim at least along its lateral margins and to extensions or "spokes" on the wheel at apertures provided in the otherwise continuous felloe of the rim. The suspending material of elastomeric character is subjected at such apertures to the air pressure within the tires, directly in the case of tubeless tires and through the intervening tube when such is used, so that it is stressed when the tire is inflated, imparting lateral stability to the assembly, such stability in the preferred embodiment being further insured by lugs on the rim extending inwardly into overlapping relation with the metal of the wheel but in normally spaced relation thereto at each side of the spokes which are bonded to the elastic medium.

Thus all metal-to-metal contact between the rim and the wheel is avoided, even the lugs which insure lateral stability of the wheel being shod with neoprene bumpers on their ends presented to the lateral surfaces of the spokes.

The complete flexibility between the rim and the wheel thus attained achieves internal springing of a pneumatic tired wheel in four directions, vertical, longitudinal (direction of travel), lateral, and torsional, with resultant shock-absorbing or damping action in each. The absorption of much of the vertical shocks from bumps on the road surface and longitudinal shocks as caused by the far edges of potholes and by similar acute obstacles makes possible the reduction of the weight and cost of the entire suspension and steering mechanism and wheel construction, while the reduction in bounce of the wheels not only acts to keep the tires in contact with the road surface with improved directional stability and reduction in tire wear but also reduces the shock to the driving train of differential, universal joints, and transmission as the drive wheels re-engage the road surfaces when they do leave it, thus making possible lighter and less costly parts. The torsional cushioning action between the rim and the wheel also reduces the shocks to the driving train from power surges in clutch engagement and gear shifting, and lessens the tendency of the tire to spin or skid on sudden application of power or brakes. Additionally, the improved wheel permits stiffening of the shock absorbers, thus reducing sway, roll, and lean, improving the cornering ability of the vehicle. Also, for reasons not wholly clear, it appears in practice to make a marked improvement in braking and acceleration, especially on slippery surfaces, possibly through its yield under torsion. Further, the suppression of small-amplitude high-frequency vibrations which effects the decrease in tire noise and body rumble and the vibration transmitted through the steering wheel adds noticeably to the comfort of the passengers, and the increase in driving stability to their safety. Finally, the lessened strain on the tires cuts down their heating at high speeds and enables lighter constructions to be employed with safety and extended life.

An illustrative embodiment of the invention in a pneumatic tired vehicle wheel is shown in the accompanying drawings in which, FIG. 1 is a face view of a vehicle wheel embodying the invention.

FIG. 2 is a transverse section of the same on line 2—2 of FIG. 1, and also showing the brake drum.

FIG. 3 is a section on line 3—3 of FIG. 1.

FIG. 4 is a section on line 4—4 of FIG. 2.

Referring to the drawings, the novel wheel assembly of the invention comprises a wheel proper, indicated at 1, of pressed steel and conforming to contemporary disc wheel pattern in having a dished or offset area providing a bolting flange 3 and a central aperture 5 which fits over the hub (not shown) of the vehicle's axle, the flange 3 having the usual holes for the studs 7 fixed in the brake drum 4 whereby the wheel is secured to the hub (not shown) by the customary nuts 9.

In accordance with the invention, the peripheral flange 11 of the wheel proper 1 is formed with integral radial extensions 13 which act as spokes in connecting the wheel 1 to the rim 15. An odd number of these spokes 13, herein 5, is preferred.

The rim 15 made of pressed steel, is composed of a main portion 17 of mainly conventional continuous type having a dropped central web 29 and cylindrical seats 19 for the beads 21 of a conventional tire 23, with the usual flange 25 for the retention of the beads. But in accordance with the invention, rectangular apertures 27 of substantial width and materially greater peripheral extent, are formed in the web 29 of the dropped center area, and matching in number and peripheral spacing the spokes 13.

The felloe of the rim is composed of two continuous rings 31, 32, of pressed steel, symmetrical with respect to each other except that the ring 32 has a laterally extended flange 34 for attaching it to the rim. The ring 31 is affixed as by welding to the sloping shoulder which joins one of the seats 19 with the web 29 at one side of such web.

A continuous band, ring, or annulus of elastomeric material 35 is mounted against the radially inward surface of web 29 of the rim with its marginal portions overlapped by the beads 33 of the felloe. This band is the connecting element between the rim 15 and the wheel 1 and is preferably formed of butyl rubber or neoprene of suitable consistency, thickness, and resilience to stand the stresses and supply the resilient support to be met with in use. It can be of uniform thickness, as illustrated, but it can also be shaped in cross-section so as to vary its response to the load as desired. Butyl rubber is preferred for its special ability to absorb vibration and resist bouncing. Other synthetic elastomers of known characteristics are also contemplated for use in certain instances. This band is adhesively or thermally bonded to all portions of the surfaces of rim 15 and the two rings 31 and 32 forming the felloe with which it is in contact, and closes and seals the apertures 27 in airtight relation.

Each of the spokes 13 extends into and preferably through the thickness of the resilient element 35, whereas illustrated in FIG. 2 its outer end is flush with the outward surface of such element 35, suitable close-fitting apertures being provided in the element 35 to admit the spokes. Each spoke 13 is fixed to the element 35 by adhesive or thermal bonding means and material throughout its area of contact with the sides of the aperture, suitable modern bonding techniques and materials for this purpose being known and commercially available. As shown in FIG. 4, each spoke 13 is centrally located in the apertures 27 formed in the web 29 of the rim 15, so that the elastic material of band 35 is free to flex throughout this area, permitting relative movement between the rim and the spokes of wheel 1.

After the band 35 is installed on the ends of the spokes 13 and the rim 15 slid into position over the spokes and band until the latter seats under the bead 33 of the welded ring 31, and preferably before the band is bonded to these elements, the other ring 32 is put into place as shown in FIG. 2 and fastened securely, as by rivets 36 or by spot-welding to the rim 15, or as preferred.

When the tire 23 is inflated, the air pressure therein acting directly or through the intervening inner tube (not shown) when present stresses the elastic element 35 throughout the area of each aperture 27, resisting minor lateral digression of the spokes, and thus of the rim with respect to the wheel. Major relative lateral movement is prevented by lugs 37 integrally formed on each part 31 of the felloe at the location of each spoke 13, each lug having its end bent toward the adjacent side of the spoke and overlapping the aperture 27 and shod with a neoprene bumper 39. The small clearance between the pair of bumpers at each spoke provides for radial movement of the spoke in the rim without contact with the bumpers normally, yet the lugs rule out any substantial amount of lateral digression or wabble of the rim and tire. The lugs 37 are arched radially inwardly from the elastic band 35 far enough to avoid interfering contact with the band as the latter flexes.

As is obvious, the load borne by the wheel is supported wholly by the areas of elastomeric material included within the bounds of the several rectangular openings 27 in the web 29 of the rim, and conversely all stresses from the tire and rim can reach the wheel proper 1 only insofar as they can be transmitted by these areas of the rubber or other plastic material.

Bumpers 41 are provided on the wheel 1, being formed preferably integrally therewith midway between each pair of spokes 13, and having rounded edges and corners. These protect the rubber and its bonded joints from excessive and damaging strains, by engaging with the band 35 where it is backed up by the web 29, thus limiting the radial excursions of the spokes on severe bumps.

The relatively great peripheral length of the apertures 27 and the resulting length of the band that is free from the rim at each aperture gives liberal scope of movement of the spokes both radially and longitudinally of the rim, and distributes the strains of the torsional forces incident to driving and braking over an ample extent of the band to avoid fatigue thereof.

While I have illustrated and described a certain form in which the invention may be embodied, I am aware that many modifications may be made therein by any person skilled in the art, without departing from the scope of the invention as expressed in the claims. Therefore, I do not wish to be limited to the particular form shown, or to the details of construction thereof, but what I do claim is:

1. A pneumatic tired vehicle wheel having in combination a wheel portion for attachment to a vehicle hub, such portion having radial extensions which act as spokes, a rim having spaced seats for the tire and an intervening web which is provided with peripherally spaced apertures therethrough, and a continuous band of elastomeric material mounted against the radially inward surface of such web and closing and sealing the apertures therein, the radial extensions being adhesively bonded to the band within the areas of the latter which underlie the respective apertures.

2. In a pneumatic tired vehicle wheel, in combination, a rim having apertures intermediate its width, a band of elastomeric material bonded to the radially inward surface of the rim and closing the apertures, and a wheel proper having spokes fixed to the band within the respective areas thereof underlying the apertures.

3. The combination according to claim 2 in which portions of the wheel intermediate the spokes are adapted to engage the band between the apertures and thus limit the radial movement of the spokes with respect to the rim.

4. In a pneumatic tired vehicle wheel having in combination a wheel proper having spokes, a rim having spaced seats for the tire and an intervening web that has peripherally spaced apertures, and a band of elastomeric material mounted against the radially inward surface of the web and closing the apertures, the spokes being affixed to the elastomeric material at the apertures, the rim having flanges extending radially inward with inturned beads overlapping the margins of the band.

5. The combination according to claim 4 in which the rim has lugs thereon overlapping the respective apertures at opposite sides of each spoke and limiting the lateral movement of the rim relative to the wheel.

6. A pneumatic tired vehicle wheel having in combination a wheel proper having spokes, a rim having a central web having a series of circumferentially spaced apertures therein, a band of elastomeric material mounted against and affixed to the radially inward surface of the web and affixed to the spokes within the areas of the apertures, the portions of the wheel proper intervening between spokes being normally spaced from the band but adapted to engage the latter where supported by the web so as to limit the movement of the rim radially toward the wheel proper.

References Cited in the file of this patent

UNITED STATES PATENTS

| | | |
|---|---|---|
| 1,356,115 | Saul | Oct. 19, 1920 |
| 2,856,978 | Mullins | Oct. 21, 1958 |
| 2,872,962 | Laurent | Feb. 10, 1959 |